(12) United States Patent
Boehlau et al.

(10) Patent No.: US 7,345,271 B2
(45) Date of Patent: Mar. 18, 2008

(54) OPTOELECTRIC SENSING DEVICE WITH COMMON DEFLECTION DEVICE

(75) Inventors: Christian Boehlau, Rietberg (DE); Johann Hipp, Hamburg (DE)

(73) Assignee: IBEO Automobile Sensor GmbH, Hamburg (DE)

( * ) Notice: Subject to any disclaimer, the term of this patent is extended or adjusted under 35 U.S.C. 154(b) by 0 days.

(21) Appl. No.: 10/528,245

(22) PCT Filed: Sep. 15, 2003

(86) PCT No.: PCT/EP03/10238

§ 371 (c)(1),
(2), (4) Date: Nov. 3, 2005

(87) PCT Pub. No.: WO2004/036245

PCT Pub. Date: Apr. 29, 2004

(65) Prior Publication Data

US 2006/0145062 A1    Jul. 6, 2006

(30) Foreign Application Priority Data

Sep. 25, 2002   (DE) ................. 102 44 641

(51) Int. Cl.
*G01B 11/24* (2006.01)
(52) U.S. Cl. .................. 250/221; 250/234; 250/236; 356/398
(58) Field of Classification Search ........ 250/234–236, 250/221; 356/4.01, 5.01
See application file for complete search history.

(56) References Cited

U.S. PATENT DOCUMENTS

| | | | |
|---|---|---|---|
| 5,231,393 A * | 7/1993 | Strickland ............ 340/936 |
| 5,337,189 A | 8/1994 | Krawczyk et al. .......... 259/850 |
| 5,552,893 A * | 9/1996 | Akasu ................ 356/5.01 |
| 5,793,491 A * | 8/1998 | Wangler .............. 356/613 |
| 6,061,001 A | 5/2000 | Sugimoto .............. 340/903 |
| 6,411,374 B2 | 6/2002 | Nakase et al. .......... 356/4.01 |
| 6,649,904 B2 * | 11/2003 | Hayashi ................ 250/221 |
| 6,828,546 B2 * | 12/2004 | Reime ................. 250/221 |
| 2002/0126024 A1 | 9/2002 | Kaplan ................ 340/851 |
| 2003/0066954 A1 | 4/2003 | Hipp ................. 250/221 |

FOREIGN PATENT DOCUMENTS

| | | |
|---|---|---|
| DE | 40 26 649 C | 2/1992 |
| DE | 41 15 747 A1 | 11/1992 |
| DE | 42 19 260 A1 | 12/1993 |
| DE | 199 28 958 A1 | 11/2000 |
| DE | 101 43 060 A1 | 3/2003 |
| EP | 0 127 870 A | 12/1984 |
| EP | 0 653 720 A2 | 5/1995 |
| WO | 98/16801 A | 4/1998 |

* cited by examiner

*Primary Examiner*—Georgia Epps
*Assistant Examiner*—Tony Ko
(74) *Attorney, Agent, or Firm*—Harness, Dickey & Pierce, P.L.C.

(57) ABSTRACT

The invention relates to an optoelectronic detection device, especially a laser scanner, comprising a transmitting device for transmitting preferably pulsed electromagnetic radiation, also comprising at least one receiving device which is associated with the transmitting device and at least one deflection device which is used to guide radiation which is transmitted by the transmitting device into a monitoring area and radiation which is reflected by the monitoring area to the receiving device. The transmitting device comprises several, preferably two, separate transmitting modules which respectively transmit radiation along a specific transmission path.

25 Claims, 2 Drawing Sheets

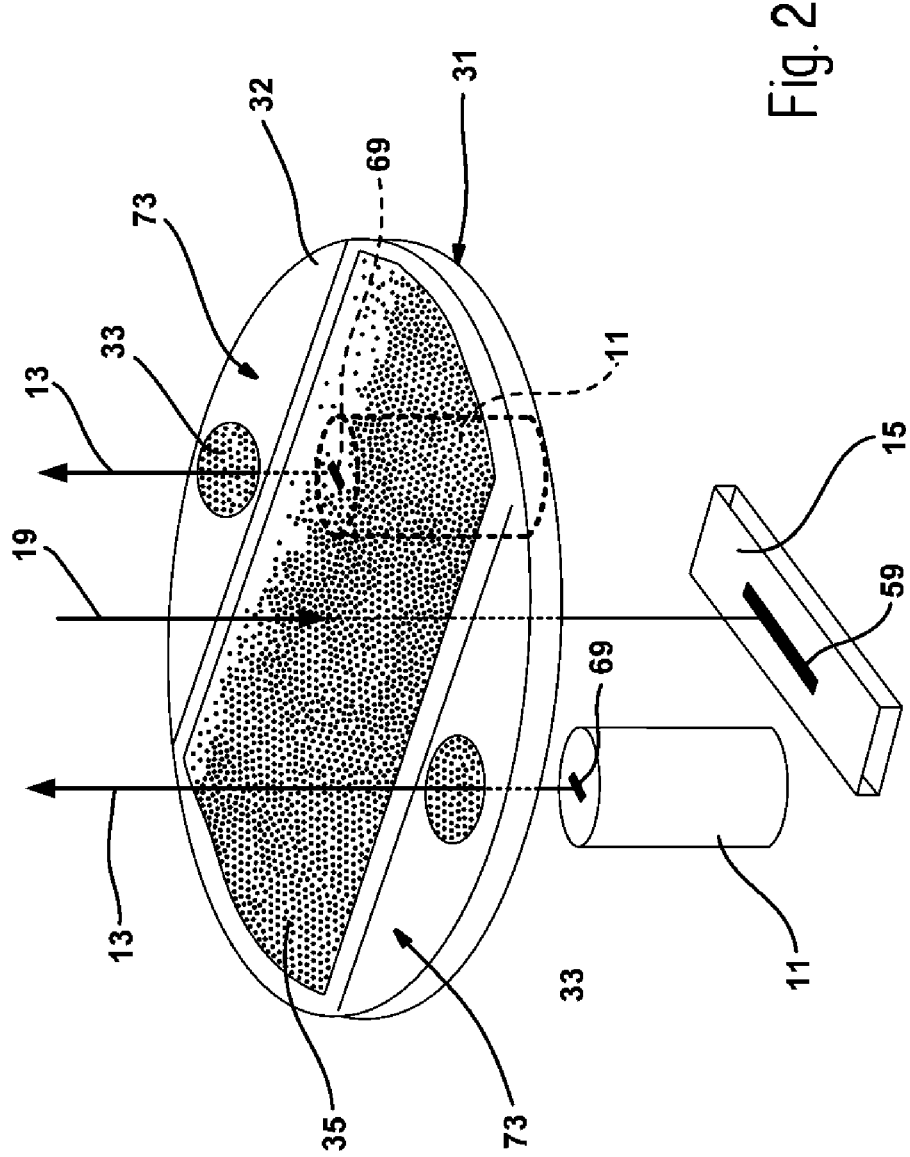

OPTOELECTRIC SENSING DEVICE WITH COMMON DEFLECTION DEVICE

CROSS-REFERENCE TO RELATED APPLICATIONS

Figure 1:
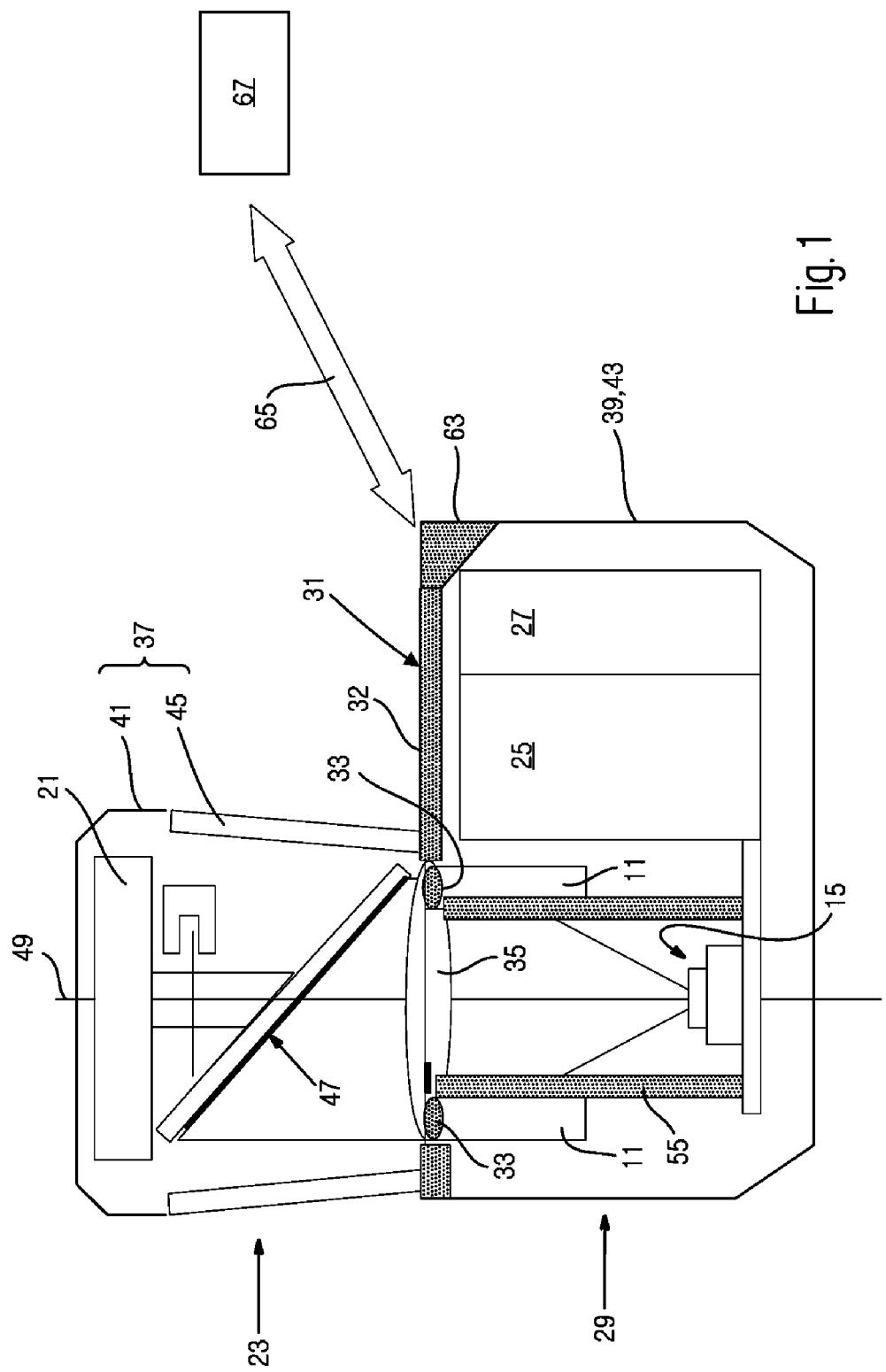

This application is a National Stage of International Application No. PCT/EP2003/010238 filed Sep. 15, 2003, published in German as WO 2004/036245 A2 on Apr. 29, 2004, which claims the benefit of German application number 102 44 641.5, filed Sep. 25, 2002. The disclosures of the above applications are incorporated herein by reference.

The invention relates to an optoelectronic sensing device, in particular to a laser scanner, having a transmitter device for the transmission of electromagnetic radiation, preferably pulsed electromagnetic radiation, at least one receiver device associated with the transmitter device and at least one deflection device with which radiation transmitted by the transmitter device can be directed into a monitored zone and radiation reflected from the monitored zone can be directed onto the receiver device.

Such sensing devices are generally known—e.g. from the German patent application 101 43 060.4, which has not yet been published and which was filed on Sep. 3, 2001—and are attached, for example, to vehicles to sense the surroundings of the vehicle during the journey.

It is the object of the invention to provide an optoelectronic sensing device of the kind initially mentioned which can be used in as versatile a manner as possible and in particular also under changing external conditions with a design which is as simple as possible and with a safe and reliable functional manner.

This object is satisfied by the features of claim 1 and in particular in that the transmitter device includes a plurality of transmitter modules, preferably precisely two transmitter modules, which are arranged spatially separate from one another and which each transmit radiation along their own propagation path.

Due to the use in accordance with the invention of more than just one individual transmitter module, the possibility results in an advantageous manner of a more flexible operation of the sensing device which will also simply be termed a scanner in the following and which can thereby be directly matched to different demands and to changing external conditions.

Since, in accordance with the invention, the radiation intensity required for a desired manner of the scanning of the monitored zone does not have to be made available by a individual transmitter module alone, but rather the required radiation intensity is generated jointly by a plurality of transmitter modules, the transmitter modules of the transmitter device in accordance with the invention can be operated with a substantially lower radiation power in comparison with a scanner having only one individual transmitter module. A considerable performance reserve for the transmitter modules is thereby present in the normal operation of the transmitter device.

This performance reserve can in particular be used to increase the radiation power of the transmitter modules in the event of increasing contamination of the radiation exit surface of the scanner, whereby it is achieved that, even with comparatively high contamination, usable measurements can still be carried out. Depending on the components specifically used for the transmitter modules, the service life of the transmitter modules can moreover be extended by the possibility in accordance with the invention of operating the transmitter modules at a comparatively low normal transmitter power.

Preferred embodiments of the invention are also recited in the dependent claims, in the description and in the drawing.

In accordance with a preferred embodiment of the invention, provision is thus made for the propagation paths of the radiation transmitted by the transmitter modules to extend free of overlap at least partly, preferably at least inside a near zone of the sensing device relevant for the safety of the eyes. It is ensured by this freedom from overlap that the propagation paths of the transmitter radiation, also termed transmitter channels in the following, extend completely separately from one another at least in the distance zones provided for this purpose. Consequently, in these zones, an object not exceeding a specific maximum size can at best only be hit by one of the transmitter modules, but not by a plurality of transmitter modules simultaneously.

This advantageous circumstance is in particular of importance with respect to the prescribed safety of the eyes on the use of laser radiation, i.e. when the "object" located in a monitored zone is a human eye. Since an eye can no longer be hit by more than one of the transmitter modules in that distance zone in which the transmitter channels extend separately from one another, it is possible to increase the transmitter powers of the transmitter modules beyond the normal transmitter power without impairment of the safety of the eyes, for example when this is indicated—as already mentioned above—due to increasing contamination of a radiation exit surface. Consequently, in particular with respect to the demanded safety of the eyes, the maximum radiation powers to be observed in this respect can also be "fully exploited" independently of one another.

In the zones disposed further away from the sensing device, in which the transmitter channels of the transmitter modules can at least partly overlap, the aspect of the safety of the eyes is at most of subordinate importance, since in practice the radiation intensity is reduced due to the beam expansion and/or due to an attenuation of intensity by material located in the propagation path such that the safety of the eyes to be observed is even always ensured in zones of mutually overlapping transmitter channels even with a maximum output power of the transmitter modules.

In a further embodiment of the invention, the transmitter modules are made and aligned such that the fronts of the transmitted radiation together form a total radiation front in the monitored zone which is preferably larger than each of the individual radiation fronts at least at distances relevant for the respective application.

The transmitter modules are preferably each designed to transmit an elongated radiation front. The radiation front can be a continuous radiation line or be formed by discrete radiation spots arranged along a line. The transmitted radiation of the transmitter modules will also simply be termed a light line in the following.

The scanning of the monitored zone hereby takes place by means of a two-dimensional radiation front for each of the transmitter modules. Together with a movement of the deflection deice relative to the transmitter modules preferably provided during the scan operation, this results overall in a three-dimensional, or quasi-three-dimensional scanning of the monitored zone when the radiation fronts each adopt different orientations in space in dependence on the position of the moved deflection device during the scan operation.

Provision is furthermore preferably made in accordance with the invention for a common receiver device to be associated with the transmitter modules. The receiver device preferably has an areal radiation receiver, with the radiation receiver preferably being matched to the shape of a total radiation front generated jointly by the transmitter modules.

If, in accordance with a further preferred embodiment, the receiver device, in particular an areal radiation receiver of the receiver device, is divided into a plurality of reception zones which can be evaluated separately from one another, with at least one reception zone being associated with each transmitter module, individual sections of the total radiation front jointly formed by the transmitter modules can be evaluated separately, i.e. a profile of the respectively scanned object can be recorded for each direction in which the light line is transmitted.

In a particularly preferred practical embodiment of the invention, the transmitter modules are arranged to the side of a common receiver device. The arrangement preferably takes place such that the transmitter modules and the receiver device lie on one line at least in projection onto a common transmission/reception plane.

It is preferred in this process for the transmitter modules to be arranged symmetrically on oppositely disposed sides of the receiver device.

If a deflection device is used which is rotatable relative to the transmitter modules and to the receiver device, provision is preferably made for the axis of rotation of the deflection device to extend centrally through the receiver device and for the transmitter modules to be arranged equally far away from the axis of rotation.

In accordance with a further particularly preferred embodiment of the invention, the spacing between the transmitter modules is maximized such that the radiation transmitted by the transmitter modules is deflected by marginal regions of the deflection device. Particularly advantageous possibilities hereby result to select the extent of the propagation paths of the radiation transmitted by the transmitter modules directly in dependence on the respective application. A greater amount of room for the setting of specific overlap properties of the transmitter channels in particular exists due to this transmitter geometry.

In a further embodiment of the invention, provision is made for the propagation path of the radiation transmitted by at least one transmitter module, on the one hand, and the reception path of the radiation reflected from the monitored zone and directed to the receiver device, on the other hand, to extend free of overlap in a near zone enclosing a radiation exit surface of the sensing device.

This freedom from overlap between the transmitter channel and the receiver channel has the consequence that radiation reflected from the near zone free of overlap does not impact the receiver device, which means that the transmitter and the receiver do "not see" one another in this region. Contamination on the radiation exit surface of the sensing device can consequently not result in irritating reflections, i.e. an advantageous insensitivity to contamination of the scanner in accordance with the invention is achieved by such an extent of the transmitter passage and the receiver passage.

The invention moreover relates to a method of operating an optoelectronic sensing device such as was described above in which the transmitter modules are controlled such that the transmitter modules transmit the radiation in a time offset, and in particular alternately, in each case in the form of radiation pulses.

The radiation pulses transmitted by the transmitter modules hereby hit an object scanned in the monitored zone sequentially in time and—if, in accordance with the preferred embodiment, a deflection device moving relative to the transmitter modules is used—offset in space with respect to the direction of movement of the deflection device.

With the preferred use of precisely two transmitter modules and a deflection device rotating continuously at a constant speed of rotation, the control of the two transmitter modules preferably takes place such that the radiation pulses of the one transmitter module are transmitted in time in the middle between successive radiation pulses of the other transmitter module. This alternating mode of operation of the two transmitter modules results in a constant angular offset between the two radiation fronts hitting the scanned object in the monitored zone and thus on a scanned object. The angular resolution of the sensing device in accordance with the invention is hereby doubled overall, without the pulse frequency of the individual transmitter modules having to be increased for this purpose.

The pulsed operation of the transmitter modules taking place with a time offset moreover results in an advantageous manner in a substantial improvement of the measuring accuracy. If, namely, one were to want to "fire" the two transmitter modules simultaneously, the problem would exist in practice that—with respect to the speed of the radiation propagation and to the received signal processing—a precise simultaneity of the radiation transmission is not realizable. Even a very small unintended time offset results in crosstalk, also known as a "blooming" effect, between adjacent receiving zones of the receiver associated with different transmitter modules, at least with objects having a relatively high reflectivity. When the radiation pulse of the one transmitter module hits the object, but the radiation pulse of another transmitter module does not, the radiation of the hitting transmitter module can also be reflected by the object onto the receiving zone of the other, non-hitting transmitter module so that the evaluation of the transmitter module not hitting it "conjures up" the presence of an object although the corresponding transmitter module did not hit any target at all.

Apparent measurements of this type or virtual targets are reliably avoided by the operation of the transmitter modules described above taking place directly with a time offset.

The invention furthermore relates to the use of at least one optoelectronic sensing device such as has been described above in connection with a vehicle. The optoelectronic sensing device is in particular used for object recognition and object tracking.

An optoelectronic sensing device is preferably used which is made or is attached to or in the vehicle such that, in normal driving operation, elongated radiation fronts transmitted by the transmitter modules respectively extend, on a propagation in the direction of travel, at least substantially in a vertical direction, with the radiation fronts preferably lying over one another in a vertical direction.

This use has the advantage that height information, e.g. on preceding vehicles, can be obtained from the zone disposed in front of the vehicle in the direction of travel.

The invention will be described in the following by way of example with reference to the drawing. There are shown:

FIG. 1 schematically, in a side view, the design of a laser scanner in accordance with an embodiment of the invention; and FIG. 2 schematically, a perspective view of some components of a laser scanner in accordance with the invention.

The sensing device, also simply termed a scanner in the following, includes a deflection module 23 comprising i.a. a rotary mirror 47 which is driven by a flat motor 21 to make a continuous rotary movement around an axis of rotation 49 during the scan operation and comprising a housing 37 which includes a self-supporting housing section 45 and a cover cap 41 releasably attached to the housing section 45.

The components of the deflection module 23 are supported at a sensor module 29 of the scanner via the housing section 45.

The sensor module 29 includes a support structure 31 which is preferably manufactured as a an aluminum die cast part and has a plate-like cover section 32 as well as a light shaft 55 extending perpendicular to the cover section 32 as a further functional section of the support structure 31.

The housing section 45 is connected, in particular by screwing, to the cover section 32 of the support structure 31. The deflection module 23 is hereby connected as a whole to the support structure 31, and thus to the sensor module 29, via the housing section 45.

A cover cap 43 forming the housing 39 of the sensor module 29 is moreover connected, in particular by screwing, to the support structure 31. The cover cap 43 can be removed from the support structure 31, without further components of the sensor module 29 having to be dismantled.

These further components in particular include two laser modules 11 and a receiver 15, which are attached to the light shaft 55 of the support structure 31, as well as an evaluation unit 25 connected to the receiver 15 and a supply unit 2 to supply both the sensor module 29 and the deflection module 23 with electrical energy. The sensing device in accordance with the invention is connected to an evaluation computer 67 and to a power source (not shown) during operation via a connection region 63 formed at the sensor module 29 and via communications and supply lines 65.

During the scan operation, laser radiation is in particular transmitted in the IR region in the direction of the deflection mirror 47 by the transmitter modules 11 and is deflected by said deflection mirror through the housing section 45 of the deflection module 23 which at least regionally transmits the radiation used into a monitored zone, whereupon radiation reflected from the monitored zone is in turn directed via the deflection mirror 47 into the light shaft 55 of the sensor module 29 and onto the receiver 15 and is evaluated with the aid of the evaluation unit 25 and the computer 67.

To permit the propagation of the radiation between the sensor module 29 and the deflection module 23 through the cover section 32 of the support structure 21, the support structure 31 is provided—at the corresponding positions—with two transmitter lenses 33 each associated with one of the laser modules 11 and a receiver lens 35 associated with the receiver 15, all lenses being integrated into the support plate 31. This will be looked at in more detail in connection with FIG. 2.

The design of the sensing device per se shown in FIG. 1 and made as a laser scanner and the adjustment of the scanner components per se are moreover each the subjects of a further German patent application filed on the same day as the present patent application so that details in this respect are not looked at in any more detail.

FIG. 2 shows a preferred example for the integration of an optical transmitter and receiver system such as has been described above into a support structure of a laser scanner, with the support structure 31 in FIG. 2 being shown in a simplified representation in the form of a circular disk. Generally, the support structure 31 in accordance with the invention can have any desired simple or complex spatial structure and can be adapted to the shape of a housing of a sensor module and/or of a deflection module of the respective sensing device to be closed, such as is also shown by way of example in FIG. 1.

The receiver lens 35 of a comparatively large area has a circular shape reduced by two mutually diametrically opposed circle sections. The regions 73 of the omitted circle sections are taken up by the support structure 31. A circular transmitter lens 33 whose extent is small with respect to the extent of the receiver lens 35 is arranged in these regions 73. The two transmitter lenses 33 are arranged symmetrically such that the centers of the circular transmitter lenses 33 and the center of the receiver lens 35 lie on one line and the two transmitter lenses 33 are disposed equally far away from the center of the receiver lens 35 through which the axis of rotation 49 (not shown) of the rotary mirror 47 extends (cf. FIG. 1). The transmitter lenses 33 lie within the circle determined by the receiver lens 35, whereby a space-saving arrangement is achieved overall.

The integration of an optical transmitter and/or receiver system into a central support structure of a laser scanner per se is the subject of a further German patent application filed on the same day as the present patent application so that details in this respect this will not be looked at any more closely.

The arrangement of the lenses 33, 35 corresponds to the arrangement of the laser modules 11 and of the receiver 15. The laser modules 11 are consequently arranged symmetrically on oppositely disposed sides of the receiver 15, with the axis of rotation 49 (not shown in FIG. 2) of the rotary mirror 47 (cf. FIG. 1) extending centrally through the receiver device 15. The laser modules 11 are consequently arranged equally far away from the axis of rotation 49 in a direction perpendicular to the axis of rotation 49.

As FIG. 1 in particular shows, the spacing between the laser modules 11 is at a maximum with respect to the size of the rotary mirror 47, i.e. the radiation 13 transmitted by the laser modules 11 impacts the rotary mirror 47 in marginal regions.

The scanner in accordance with the invention consequently does not have only one individual radiation source, but a plurality of laser modules 11—precisely two in the preferred embodiment described here—which are moreover arranged at maximum eccentricity with respect to the axis of rotation 49 of the rotary mirror 47 coinciding with the optical axis of the reception path.

The laser modules 11 are each provided with a radiation source in the form of a semiconductor laser diode 69 which are only shown schematically in FIG. 2. The laser diodes 69 in the embodiment described here each form a linear radiation source so that consequently each laser module 11 transmits the radiation with an elongated radiation front which is also simply termed a light line in the following.

The orientation of the transmitted light lines in space is dependent on the angular position of the rotary mirror 47 relative to the stationary laser modules 11 at the moment of the incidence of the radiation fronts on the rotary mirror 47. With a rotary mirror 47 rotating during the scan operation, the orientation of the elongated radiation fronts in space consequently changes continuously, i.e. the scanning of the monitored region takes place by rotating light lines. The concept of a linear or line-shaped radiation source in conjunction with a deflection device rotating relative to this radiation source at a laser scanner is the subject of the initially already mentioned, not yet published German patent application 101 43 060.4 filed on Sep. 3, 2001 so that details in this respect will not be looked at any more closely.

In a preferred vehicle application, the laser scanner mounted on the vehicle is preferably aligned in accordance with the invention such that the light lines extend vertically to the front in the direction of travel and in the reverse direction, i.e. the vehicle surroundings are scanned to the front and to the rear with a large vertical angle. The vertical divergence of the radiation transmitted by the two laser modules 11 amounts to 1.6° in each case in a preferred embodiment so that a vertical beam divergence of 3.2° results overall.

The receiver device 15 includes a receiving array 59 of photodiodes arranged successively which is made in linear or line-shape in accordance with the light lines transmitted by the laser modules 11. A total of eight photodiodes are preferably provided of which two respective adjacent photodiodes are connected together to form a jointly evaluated diode pair. Two diode pairs are associated with each laser module 11, i.e. the light line of each laser module 11 reflected from the monitored zone is imaged on two adjacent diode pairs. A receiver amplifier is associated with each diode pair.

A scanning of the monitored zone in four scan planes effectively takes place by this division of the receiver array 59 into a total of four successive receiving zones, with each of the two laser modules 11 realizing two scan planes with its transmitted light line.

As described in the introductory part, the two laser modules 11 are not "fired" simultaneously during the scan operation, but the transmission of the radiation pulses 13 rather takes place alternately. For this reason, work does not take place with four evaluation modules, but only with two evaluation modules for the distance measurement which are operated in a multiplex process.

The angular resolution of the scanner in accordance with the invention is dependent on the rotational frequency of the mirror 47 and on the pulse frequency of the laser modules 11. The latter preferably amounts to a constant 14.4 kHz, whereas rotational frequencies can preferably be set for the mirror 47 of 10 Hz, 20 Hz and 40 Hz. Angular resolutions result from this of 0.25°, 0.5° and 1.0° with respect to a laser module 11 or to a plurality of synchronously operated laser modules 11. The alternating operation of the two laser modules 11 preferred in accordance with the invention results, in contrast, in an improvement of the angular resolution by the factor of 2, i.e. with a rotational frequency of 10 Hz, an angular resolution of 0.125° results.

The content of all aforementioned further patent applications is herewith included in the present patent application by way of reference.

REFERENCE NUMERAL LIST

11 transmitter module, laser module
13 transmitted radiation
15 receiver device
19 reflected, received radiation
21 drive unit
23 deflection module
25 evaluation unit
27 supply unit
29 sensor module
31 support structure
32 cover section
33 transmitter lens
35 receiver lens
37 housing of the deflection module
39 housing of the sensor module
41 cover cap of the deflection module
43 cover cap of the sensor module
45 radiation exit surface, housing section
47 reflection surface, mirror
49 rotary axis
55 shaft
59 radiation receiver, receiver array
63 connection region
65 lines
67 computer
69 laser diode
73 region of an omitted circle section

The invention claimed is:

1. An optoelectronic sensing device, comprising a transmitter device for the transmission of electromagnetic radiation, at least one receiver device associated with the transmitter device and at least one deflection device, with which radiation transmitted by the transmitter device can be directed into a monitored zone and radiation reflected from the monitored zone can be directed onto the receiver device, characterized in that the transmitter device includes a plurality of transmitter modules which are spatially separate from one another and which each transmit radiation along their own propagation path, the transmitter modules are aligned such that fronts of the transmitted radiation together form a total radiation front in the monitored zone which is larger than the fronts of the transmitted radiation from one of the transmitter modules and can be controlled for alternate transmission of radiation pulses; and the deflection device has a common planar reflection surface configured to receive radiation transmitted by each of the transmitter modules and reflected from the monitored zone with the radiation transmitted by the transmitter modules and the radiation reflected from the monitored zone being incident on the reflection surface at regions spatially separate from one another, the deflection device rotatable configured to carry out a continuous rotary movement at a constant rotational speed.

2. A sensing device in accordance with claim 1, characterized in that the propagation paths of the radiation transmitted by the transmitter modules extend free of overlap in a region near to the sensing device.

3. A sensing device in accordance with claim 1, characterized in that the transmitter modules are each made for the transmission of an elongated radiation front, with the elongated radiation front being a continuous radiation line or being formed by discrete radiation spots arranged along a line.

4. A sensing device in accordance with claim 1, characterized in that the transmitter modules each include at least one laser diode as a radiation source which is designed for the transmission of a linear or line-shaped radiation front.

5. A sensing device in accordance with claim 1, characterized in that an optical transmitter is positioned in front of each transmitter module.

6. The optoelectronic sensing device of claim 5 wherein the optical transmitter system is in the form of a lens.

7. A sensing device in accordance with claim 1, characterized in that the transmitter modules and/or optical transmitter systems positioned in front of the transmitter modules are made with the same construction.

8. A sensing device in accordance with claim 1, characterized in that a common receiver device is associated with the transmitter modules.

9. A sensing device in accordance with claim 1, characterized in that the receiver device is matched to a shape of a total radiation front jointly generated by the transmitter modules.

10. A sensing device in accordance with claim 1, characterized in that an optical receiver system is associated with each receiver device and is disposed in a common transmitter/receiver plane together with optional transmitter systems positioned in front of the transmitter modules.

11. A sensing device in accordance with claim 1, characterized in that a reflection surface of the deflection device extends at an inclination to a common transmitter/receiver plane of the transmitter modules and of the receiver device and in that the deflection device is rotatable around an axis extending approximately perpendicular to the transmitter/receiver plane.

12. A sensing device in accordance with claim 1, characterized in that the transmitter modules are arranged adjacent to the receiver device.

13. A sensing device in accordance with claim 1, characterized in that the transmitter modules are arranged symmetrically on oppositely disposed sides of the receiver device.

14. A sensing device in accordance with claim 1, characterized in that the spacing between the transmitter modules is maximized such that the radiation transmitted by the transmitter modules is deflected by marginal regions of the deflection device.

15. A sensing device in accordance with claim 1, characterized in that the propagation path of the radiation transmitted by at least one transmitter module, and the receiving path of the radiation reflected from the monitored zone and directed onto the receiver device, extend free of overlap in a near region of the sensing device.

16. A sensing device in accordance with claim 1, characterized in that the transmitter modules can be controlled for the alternate transmission of radiation pulses.

17. The optoelectronic sensing device of claim 1 is further defined as a laser scanner.

18. The optoelectronic sensing device of claim 1 wherein the plurality of transmitter modules is further defined as two transmitter modules.

19. An optoelectronic sensing device, comprising a transmitter device for the transmission of electromagnetic radiation, at least one receiver device associated with the transmitter device and at least one deflection device, with which radiation transmitted by the transmitter device can be directed into a monitored zone and radiation reflected from the monitored zone can be directed onto the receiver device, characterized in that the transmitter device includes a plurality of transmitter modules which are spatially separate from one another and which each transmit radiation along their own propagation path, the transmitter modules are aligned such that fronts of the transmitted radiation together form a total radiation front in the monitored zone which is larger than the fronts of the transmitted radiation from one of the transmitter modules and can be controlled for alternate transmission of radiation pulses; and the deflection device has at least one planar reflection surface for radiation transmitted by the transmitter modules and reflected from the monitored zone with the radiation transmitted by the transmitter modules and the radiation reflected from the monitored zone being incident on the reflection surface at regions spatially separate from one another, the deflection device rotatable configured to carry out a continuous rotary movement at a constant rotational speed, wherein the receiver device, is divided into a plurality of receiver regions which can each be evaluated separately from one another and which each include one or more photodiodes, with at least one receiver region being associated with each transmitter module.

20. An optoelectronic sensing device, comprising a transmitter device for the transmission of electromagnetic radiation, at least one receiver device associated with the transmitter device and at least one deflection device, with which radiation transmitted by the transmitter device can be directed into a monitored zone and radiation reflected from the monitored zone can be directed onto the receiver device, characterized in that the transmitter device includes a plurality of transmitter modules which are spatially separate from one another and which each transmit radiation along their own propagation path, the transmitter modules are aligned such that fronts of the transmitted radiation together form a total radiation front in the monitored zone which is larger than the fronts of the transmitted radiation from one of the transmitter modules and can be controlled for alternate transmission of radiation pulses; and the deflection device has at least one planar reflection surface for radiation transmitted by the transmitter modules and reflected from the monitored zone with the radiation transmitted by the transmitter modules and the radiation reflected from the monitored zone being incident on the reflection surface at regions spatially separate from one another, the deflection device rotatable configured to carry out a continuous rotary movement at a constant rotational speed, wherein an axis of rotation of the deflection device extends centrally through the receiver device and the transmitter modules are arranged equally far away from the axis of rotation.

21. A method for the operation of an optoelectronic sensing device, comprising a transmitter device for the transmission of electromagnetic radiation, at least one receiver device associated with the transmitter device and at least one deflection device, with which radiation transmitted by the transmitters device can be directed into a monitored zone and radiation reflected from the monitored zone can be directed onto the receiver device, wherein the transmitter device includes a plurality of transmitter modules, which are spatially separated from one another and which each transmit radiation along their own propagation path, and-wherein the transmitter modules are controlled such that the transmitter modules transmit the radiation with a time offset and alternately in the form of radiation pulses in each case.

22. A method for using an optoelectric sensing device with a vehicle, comprising:

mounting a sensing device to a vehicle, the sensing device comprising a transmitter device for the transmission of electromagnetic radiation, at least one receiver device associated with the transmitter device and at least one deflection device, with which radiation transmitted by the transmitter device can be directed into a monitored zone and radiation reflected from the monitored zone can be directed onto a receiver device, wherein the transmitter device includes a plurality of transmitter modules, which are spatially separated from one another and which each transmit radiation along their own propagation path, the transmitter modules are aligned such that fronts of the transmitted radiation together form a total radiation front in the monitored zone which is larger than the fronts of the transmitted radiation from one of the transmitter modules and can be controlled for alternate transmission of radiation pulses; and the deflection device has at least one planar reflection surface for radiation transmitted by the transmitter modules and reflected from the monitored zone with the radiation transmitted by the transmitter modules and the radiation reflected from the monitored zone being incident on the reflection surface at regions spatially separate from one another, the deflection device rotatable configured to carry out a continuous rotary movement at a constant rotational speed; and operating the sensing device for object recognition and object tracking in relation to the vehicle by transmitting elongated radiation front in the direction of travel of the vehicle and adjusting the transmitter modules such that the elongated radiation fronts extend in a vertical direction such that an elongated vertical overall radiation front is formed.

23. An optoelectronic sensing device, comprising a transmitter device for the transmission of electromagnetic radiation, at least one receiver device associated with the transmitter device and at least one deflection device, with which radiation transmitted by the transmitter device can be directed into a monitored zone and radiation reflected from the monitored zone can be directed onto the receiver device, characterized in that the transmitter device includes a plurality of transmitter modules which are spatially separate from one another and which each transmit radiation along their own propagation path, the transmitter modules are aligned such that fronts of the transmitted radiation together form a total radiation front in the monitored zone which is larger than the fronts of the transmitted radiation from one of the transmitter modules; and the deflection device has at least one planar reflection surface for radiation transmitted by the transmitter modules and reflected from the monitored zone with the radiation transmitted by the transmitter modules and the radiation reflected from the monitored zone being incident on the reflection surface at regions spatially separate from one another, the deflection device rotatable configured to carry out a continuous rotary movement at a constant rotational speed, wherein the receiver device, is divided into a plurality of receiver regions which can each be evaluated separately from one another and which each include one or more photodiodes, with at least one receiver region being associated with each transmitter module.

24. An optoelectronic sensing device, comprising a transmitter device for the transmission of electromagnetic radiation, at least one receiver device associated with the transmitter device and at least one deflection device, with which radiation transmitted by the transmitter device can be directed into a monitored zone and radiation reflected from the monitored zone can be directed onto the receiver device, characterized in that the transmitter device includes a plurality of transmitter modules which are spatially separate from one another and which each transmit radiation along their own propagation path, the transmitter modules are aligned such that fronts of the transmitted radiation together form a total radiation front in the monitored zone which is larger than the fronts of the transmitted radiation from one of the transmitter modules; and the deflection device has at least one planar reflection surface for radiation transmitted by the transmitter modules and reflected from the monitored zone with the radiation transmitted by the transmitter modules and the radiation reflected from the monitored zone being incident on the reflection surface at regions spatially separate from one another, the deflection device rotatable configured to carry out a continuous rotary movement at a constant rotational speed, wherein an axis of rotation of the deflection device extends centrally through the receiver device and the transmitter modules are arranged equally far away from the axis of rotation.

25. A method for using an optoelectric sensing device with a vehicle, comprising:

mounting a sensing device to a vehicle, the sensing device comprising a transmitter device for the transmission of electromagnetic radiation, at least one receiver device associated with the transmitter device and at least one deflection device, with which radiation transmitted by the transmitter device can be directed into a monitored zone and radiation reflected from the monitored zone can be directed onto a receiver device, wherein the transmitter device includes a plurality of transmitter modules, which are spatially separated from one another and which each transmit radiation along their own propagation path, the transmitter modules are aligned such that fronts of the transmitted radiation together form a total radiation front in the monitored zone which is larger than the fronts of the transmitted radiation from one of the transmitter modules; and the deflection device has at least one planar reflection surface for radiation transmitted by the transmitter modules and reflected from the monitored zone with the radiation transmitted by the transmitter modules and the radiation reflected from the monitored zone being incident on the reflection surface at regions spatially separate from one another, the deflection device rotatable configured to carry out a continuous rotary movement at a constant rotational speed; and operating the sensing device for object recognition and object tracking in relation to the vehicle by transmitting elongated radiation front in the direction of travel of the vehicle and adjusting the transmitter modules such that the elongated radiation fronts extend in a vertical direction such that an elongated vertical overall radiation front is formed.

* * * * *